July 5, 1938. E. RAMIREZ 2,123,025
DEMOUNTABLE RIM
Filed Feb. 16, 1937
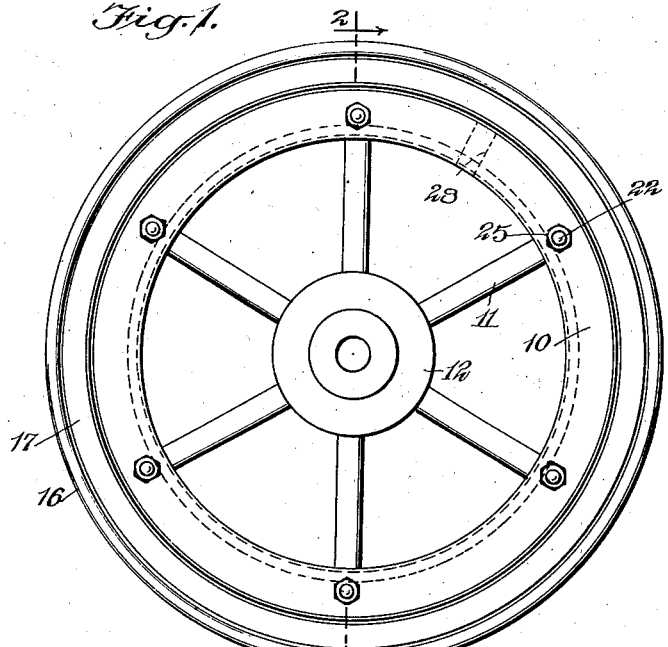
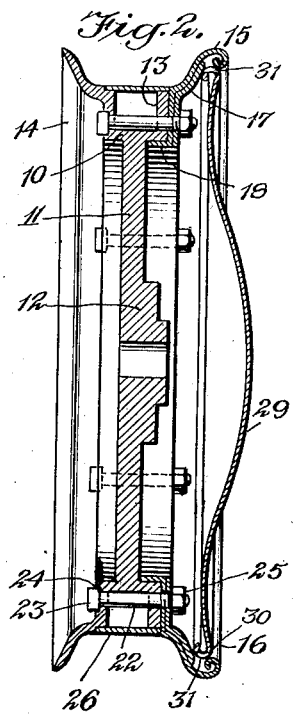
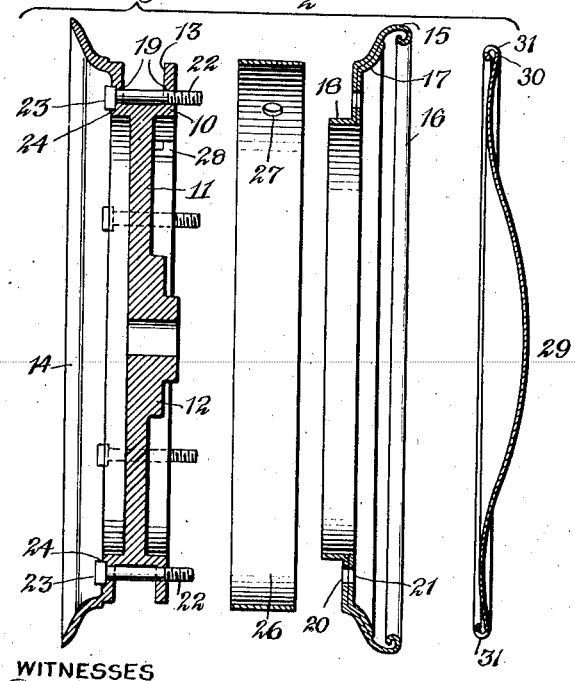
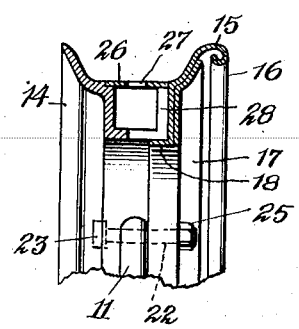
WITNESSES
INVENTOR
Emanuel Ramirez
BY
ATTORNEYS Patented July 5, 1938

2,123,025

UNITED STATES PATENT OFFICE 2,123,025

DEMOUNTABLE RIM

Emanuel Ramirez, Miraflores, Lima, Peru

Application February 16, 1937, Serial No. 125,944

1 Claim. (Cl. 152—405)

This invention relates to demountable rims, and more particularly to a combined wheel and demountable rim section which enables the removal and replacement of a tire in a minimum of time.

The invention embodies many novel features of construction and combinations and arrangements of parts, all of which will be more fully hereinafter described and pointed out in the claim.

In the accompanying drawing—

Fig. 1 is a view in side elevation of my improved wheel and demountable rim, the outer cap or cover being removed;

Fig. 2 is a view in transverse section on the line 2—2 of Fig. 1 with the cap or cover in operative position;

Fig. 3 illustrates in section the several parts of my improved wheel and demountable rim; and Fig. 4 is a fragmentary view in section, the view being taken through the recess portion of the wheel felly which receives the felly of the tire.

My improved wheel includes a felly 10, which may be connected by spokes 11 with a central hub 12, although, of course, it is to be understood that the invention is not limited to this type of wheel as any form of wheel having spokes or disks of other construction may be employed. The felly 10 is made with an annular groove or recess 13 so that the felly is of general channel shape in cross section to lighten the weight of the wheel as much as possible.

A fixed rim section 14 is secured to or made integral with the inner portion of the felly, and a removable rim section 15 is located against the outer face of the felly and at its outer portion is of general compound curvature in section conforming in general shape to the shape of the fixed rim section 14. With this exception, however, the outer rim section 15 has its outer edge turned inwardly forming an annular internal bead 16.

17 represents a ring which is located within the rim section 15 and lies flat against the inner portion of said rim section and conforms in curvature to the outer portion of the rim section so as to lie flush against the rim section throughout. This rim section 15 is formed at its inner edge with an annular inwardly projecting flange 18 located within the felly 10 and against the inner face of the felly.

The felly 10, the rim section 15, and the ring 17 are formed with registered openings 19, 20 and 21 respectively receiving bolts 22. These bolts 22 have angular heads 23 at their inner ends which normally rest in angular recesses 24 in the inner face of the felly 10 so that when nuts 25 are screwed on to the outer ends of the bolts 22 and against the ring 17, all the parts will be securely secured together and when these nuts are removed the parts may be separated to permit the removal and replacement of a tire.

In order to bridge the gap of the recess 13 in the felly, I provide an annular ring or hoop 26 which is located within the tire and fits around the outer face of the felly. This hoop 26 is provided with an opening 27 to receive the valve of the tire, and the felly 10 is provided with a recess 28 which also accommodates the valve of the tire and permits the removal of the tire.

29 represents a cap or removable cover plate which is preferably of general concavo-convex shape and is provided at its outer edge with an inwardly turned portion constituting a bead 30 which is adapted to spring into the bead 16 on the rim section 15 and be retained within the rim section but can be easily removed by the insertion of a proper tool through a recess 31 in the disk 29.

While I have illustrated and described what I believe to be a preferred embodiment of my invention, it is obvious that various slight changes may be made with regard to the form and arrangement of parts without departing from my invention, and hence I do not limit myself to the precise details set forth but consider myself at liberty to make such changes and alterations as fairly fall within the spirit and scope of the claim.

I claim:

In combination with a wheel, a channel shaped felly constituting an integral part of the wheel, a rim section integral with the inner flange of the wheel felly, a removable rim section located against the outer face of the wheel felly, a removable tire supporting hoop located around the felly between the rim sections, a ring located against the outer face of the removable rim section, an annular flange on the removable rim section located within the wheel felly, said felly, removable rim section and ring having openings therein, bolts in said openings, and nuts on the bolts clamping the parts together, said bolts having angular heads at their inner ends and said felly having angular recesses in its inner face receiving the bolt heads and preventing turning movement of the bolts when the nuts are turned thereon.

EMANUEL RAMIREZ.